(12) United States Patent
Kendrick et al.

(10) Patent No.: US 10,914,900 B1
(45) Date of Patent: Feb. 9, 2021

(54) LINEAR-FAN CONFIGURATION OF PHOTONIC INTEGRATED CIRCUIT IMAGERS

(71) Applicant: LOCKHEED MARTIN CORPORATION, Bethesda, MD (US)

(72) Inventors: Richard L. Kendrick, San Mateo, CA (US); Chad E. Ogden, San Marcos, CA (US); Guy Chriqui, San Mateo, CA (US); Alan L. Duncan, Broken Arrow, OK (US)

(73) Assignee: Lockheed Martin Corporation, Bethesda, MD (US)

(*) Notice: Subject to any disclaimer, the term of this patent is extended or adjusted under 35 U.S.C. 154(b) by 184 days.

(21) Appl. No.: 16/287,981

(22) Filed: Feb. 27, 2019

(51) Int. Cl.
*G02B 6/42* (2006.01)
*G01B 9/02* (2006.01)

(52) U.S. Cl.
CPC ....... *G02B 6/4204* (2013.01); *G01B 9/02041* (2013.01)

(58) Field of Classification Search
CPC .................. G02B 6/4204; G01B 9/02041
See application file for complete search history.

(56) References Cited

U.S. PATENT DOCUMENTS 9,692,512 B2 * 6/2017 Griffith ............ H04B 10/2575
10,317,624 B1 * 6/2019 Ogden ................... G02B 6/262

* cited by examiner

*Primary Examiner* — Seung C Sohn
(74) *Attorney, Agent, or Firm* — Morgan, Lewis & Bockius LLP

(57) ABSTRACT

A photonic integrated circuit (PIC) imager includes a substrate, and a number of PIC imager units disposed in an arbitrary configuration on the substrate. Each PIC imager unit includes a PIC coupled to an optical connector, and a number of lenslets configured as a linear lenslet array and optically coupled to an edge of the PIC. Pairs of lenslets of the linear lenslet array are optically coupled to respective waveguides embedded in the PIC.

20 Claims, 5 Drawing Sheets

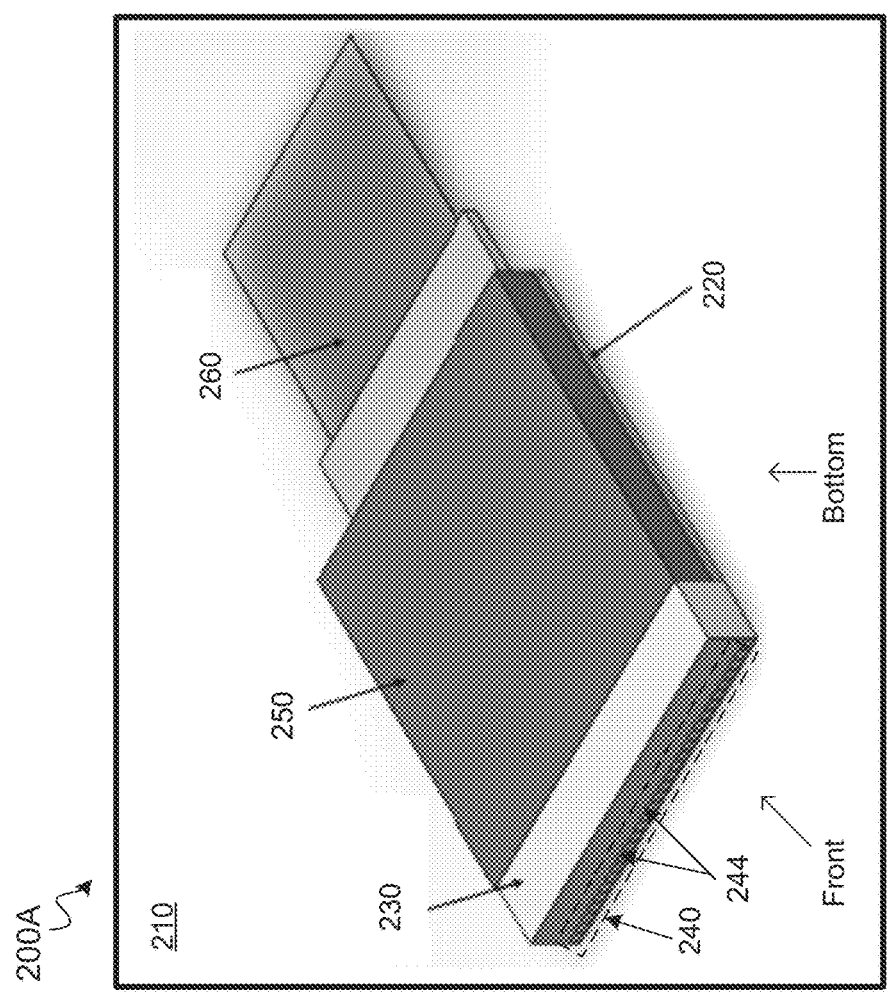
FIG. 2A
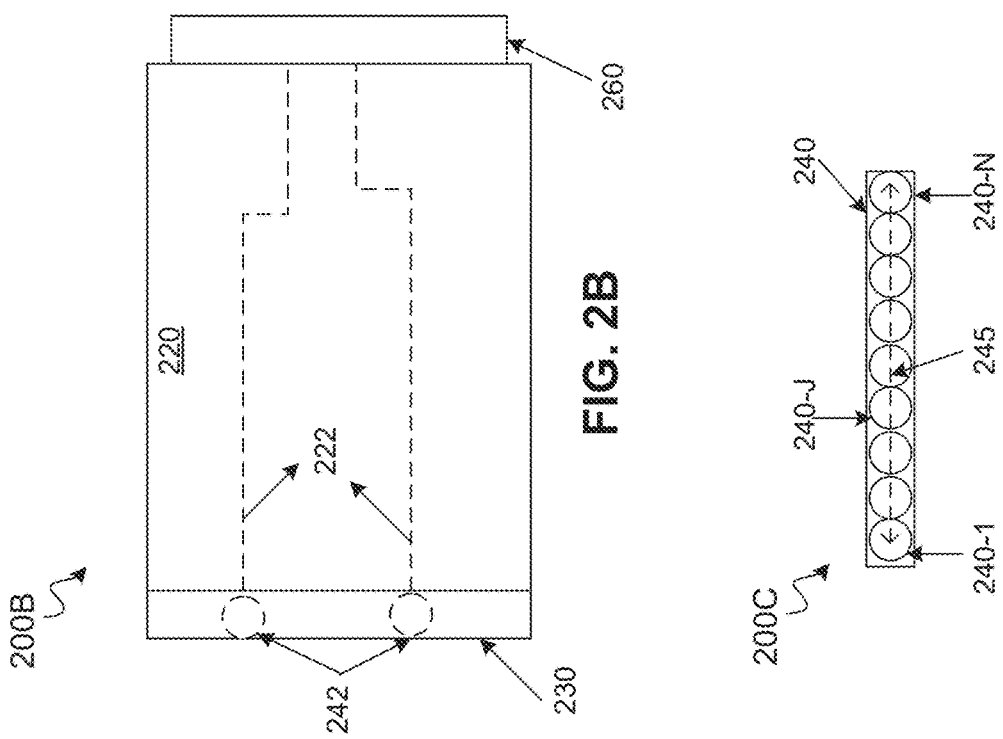
FIG. 2B
FIG. 2C

LINEAR-FAN CONFIGURATION OF PHOTONIC INTEGRATED CIRCUIT IMAGERS

STATEMENT REGARDING FEDERALLY SPONSORED RESEARCH OR DEVELOPMENT

Not applicable.

FIELD OF THE INVENTION the present invention generally relates to photonic integrated circuits, and more particularly to a linear-fan configuration of photonic integrated circuit imagers.

BACKGROUND

Segmented planar imaging detector for electro-optical reconnaissance (SPIDER) is an imaging system formed with waveguide arrays and other components needed to combine light from separate optical collectors, such as telescopes or lenslets. SPIDER can achieve the performance capability needed by a number of space missions in a radically compressed and low-mass and/or -power package. SPIDER has been used in a number of imaging systems including heterodyne imaging systems, which leverage the SPIDER concept to develop photonics-enabled heterodyne electro-optical phased array (HEOPA). Alternative SPIDER configurations with more efficiency and less size, weight and cost are required.

SUMMARY

According to various aspects of the subject technology, methods and configuration are disclosed for providing a linear-fan configuration of photonic integrated circuit (PIC) imagers.

In one or more aspects, a PIC imager includes a substrate, and a number of PIC imager units disposed in an arbitrary configuration on the substrate. Each PIC imager unit includes a PIC coupled to an optical connector, and a number of lenslets configured as a linear lenslet array and optically coupled to an edge of the PIC. Pairs of lenslets of the linear lenslet array are optically coupled to respective waveguides embedded in the PIC.

In other aspects, an interferometric imager includes a compact package of a set of multi-lenslet PIC imager units configured to sample spatial frequencies of a target. Each multi-lenslet PIC imager unit includes a PIC coupled to a lenslet module containing a lenslet array. A number of waveguides are embedded in the PIC to optically couple pairs of lenslets of the lenslet arrays to an optical connector. The PIC imager units are disposed in a random configuration on the substrate.

In yet other aspects, a method of providing a linear-fan-configured PIC imager includes fabricating each PIC imager unit of a set of PIC imager units by: coupling a PIC to an optical connector; coupling a lenslet array to an edge of the PIC; and coupling a number of waveguides embedded in the PIC to pairs of lenslets of the lenslet array. The method further includes forming the linear-fan-configured PIC imager by disposing, in an arbitrary configuration, the set of PIC imager units on a substrate.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIGS. 2A, 2B and 2C are schematic diagrams illustrating various views of an example PIC imager unit, according to certain aspects of the disclosure.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some aspects of the subject technology, methods and configurations are described for providing a linear-fan configuration of photonic integrated circuit (PIC) imagers. The disclosed linear-fan-configured PIC imager can readily fit into an arbitrary shape, for example, a long, narrow rectangle. The subject technology leverages PIC imagers that can sample spatial frequencies of a target. In order to a resolve an image of the target, the PIC imager needs to sample a sufficiently broad distribution of spatial frequencies (u,v). Samples in the spatial frequencies of a U-V plane are made via pairs of lenslets of varying separation and orientation. The vector describing the separation and direction between each pair of lenslets is called the baseline.

Currently available manufacturing technology produces lenslets in single rows, which provide a linear distribution of baseline lengths for each unit, all with the same orientation. This produces a radial spoke of samples in a U-V plane along a single angle. To fill in the U-V plane, several PIC imager units mounted at different rotation angles are packaged together. It is important to note that the position of the PIC imager units in relation to each other has no effect on the image. Thus, they may be arranged into any arbitrary distribution. The disclosed imager packages several linear PIC imager units at different orientations into a small area, with the linear PIC imager units packed together in a configuration optimized for the smallest possible size. For example, the linear PIC imager units can be packed optimally into a long, thin rectangular area.

Figure 1:
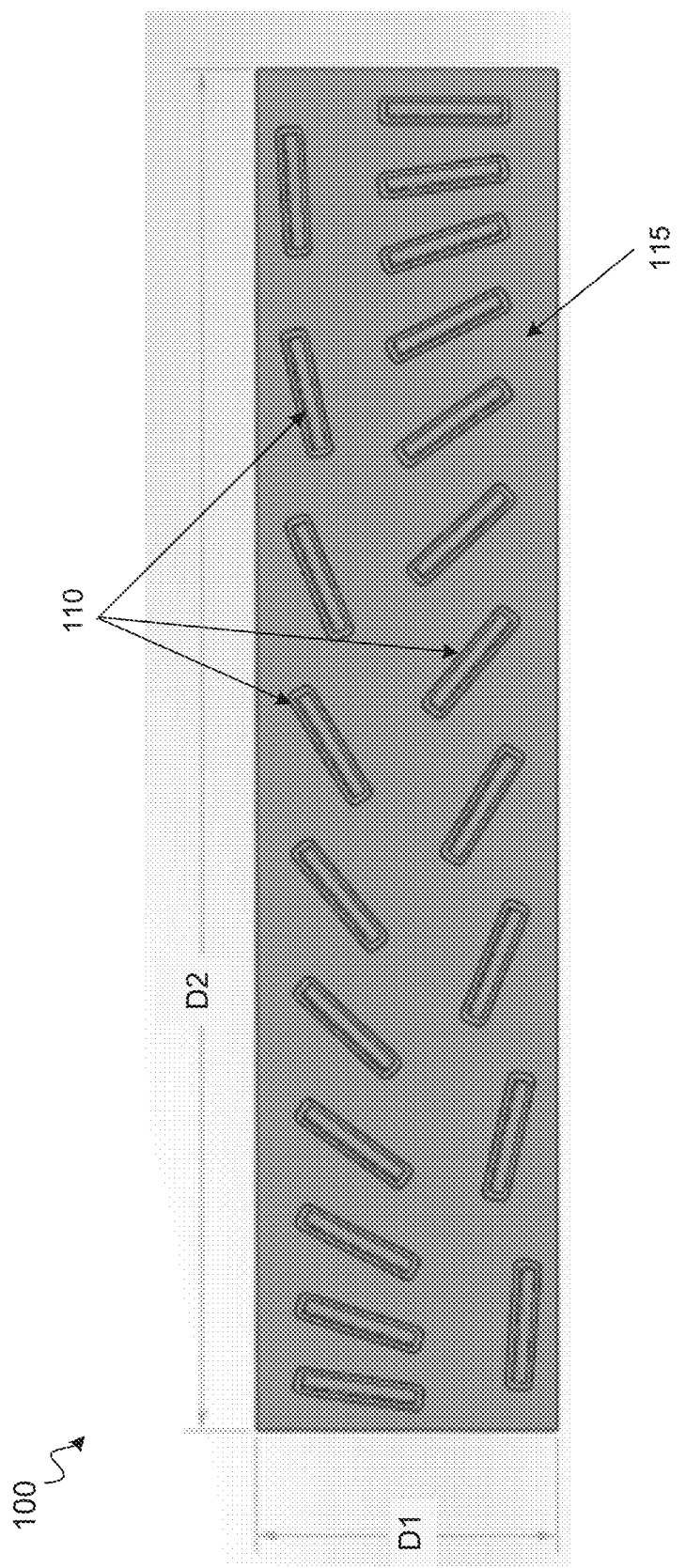
FIG. 1 is a conceptual diagram illustrating an example of a linear-fan-configured photonic integrated circuit (PIC) imager, according to certain aspects of the disclosure.

FIG. 1 is a conceptual diagram illustrating an example of a linear-fan-configured PIC imager 100, according to certain aspects of the disclosure. The linear-fan-configured PIC imager 100 (hereinafter, PIC imager 100) includes a number of (e.g., within a range of about 20-25) PIC imager units 110 disposed on a substrate 115. Each of the PIC imager units 110, as discussed herein, includes a lenslet array consisting of a linear combination of a number of lenslets and is able to sample the target in a linear fashion to generate a line of spatial frequencies in the U-V space at a specific angle. The specific angle corresponds to an orientation of those PIC imager units 110 on the substrate 115. The configuration of the PIC imager units 110 on the substrate 115 is arbitrary. In other words, the orientation and distance between the PIC imager units 110 can be selected randomly.

The random configuration of the PIC imager units 110 provides an angular diversity that results in achieving a dense (substantially filled) U-V plane, with spatial frequencies (u,v) sampled at various angles. The more angles covered by the various orientations of the PIC imagers 110, the denser the U-V plane would be, which translates into a higher resolution of interferometry image of the target. In some implementations, the dimensions D1 and D2 of the PIC imager 100 can be within a range of a few centimeters (cm) to a few tens of cm. For example, the dimension D1 can be about 6 cm, whereas the dimension D2 can be about 26 cm. The compactness of the PIC imager 100 is of value for the interferometry applications, especially for airborne applications. Therefore, optimization of the angular distribution (orientation diversity) and area coverage of the PIC imager units 110 on the substrate 115 can be crucial in achieving a compact high-resolution imager. In other words, the interspacing of the PIC imager units 110 and their orientations can be optimized, as there is a tradeoff between adding additional PIC imager units at new orientations to enhance the spatial resolution and the overall size of the PIC imager 110. The number of the PIC imager units 110 can be chosen, for example, based on the spatial resolution required by a system specification.

Regarding the substrate 115, the material of the substrate is not an important factor for the purpose of the subject disclosure, and any suitable material such as printed circuit board (PCB) material can be used to securely hold the PIC imager units 110.

FIGS. 2A, 2B and 2C are schematic diagrams illustrating various views 200A, 200B and 200C of an example of a PIC imager unit 210, according to certain aspects of the disclosure. The view 200A is a perspective view of the PIC imager 210, which includes a PIC 220, an optical module 230, an interposer 250 and an optical connector 260. The PIC 220 is optically coupled to the optical module 230 at one end and to the optical connector 260 at another end. The optical module 230 includes a lenslet array 240 formed of a number of lenslets 244. The PIC 220 includes a number of embedded waveguides that are optically coupled to the lenslets 242 of the lenslet array 240. The interposer 250 is attached to the PIC 220 and the optical module 230 and includes an electronic integrated circuit (EIC) consisting of processing and other circuitry. The optical connector 260 includes optical fibers and may be made, for example, of a fiber ribbon.

The view 200B is a bottom view of the PIC imager unit 210 and depicts the PIC 220, the optical module 230 and the optical connector 260. Also shown in the view 200B are an example of a pair of waveguides 222 which couple a pair of lenslets 242 to a corresponding pair of optical fibers of the optical connector 260. The distance between the pair of lenslets 242 defines a baseline of a number of baselines of the PIC imager unit 210.

The view 200C is a front view of the PIC imager unit 210 and depicts the lenslets array 240 including a number of (e.g., N) lenslets such as lenslets 240-1, 240-J and 240-N. The lenslets of the lenslet array 240 can be coupled to waveguides (e.g., 222) of the PIC 220 in pairs to provide a length distribution of baselines with different lengths. For example, the longest baseline 245 is formed between lenslets 240-1 and 240-N. Other baseline lengths result from pairing different lenslets of the lenslet array 230. In other words, the lenslets of the lenslet array 230 are responsible for providing a linear (length) distribution of the baselines, whereas the angular diversity or distribution is provided by different orientations of the PIC imager units 210, as shown and discussed above with respect to the PIC imager units 110 of FIG. 1.

Figure 3B:
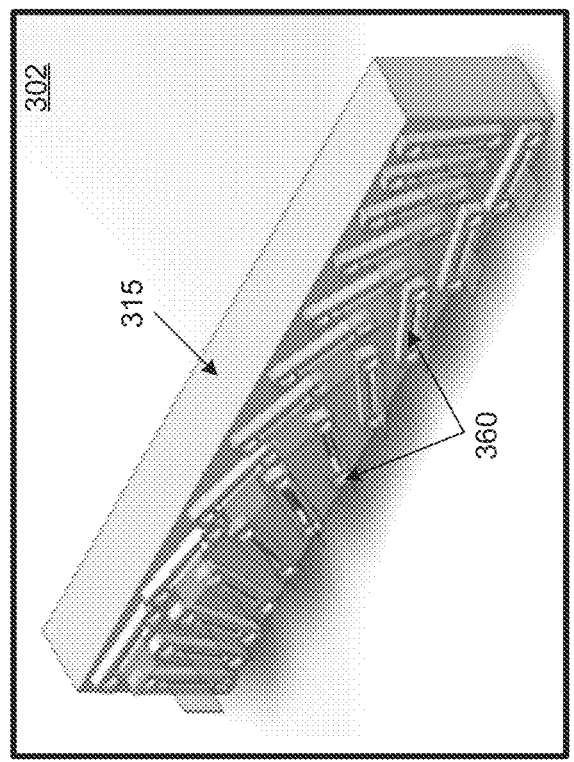
FIGS. 3A and 3B are schematic diagrams illustrating front and rear views of an example linear-fan-configured PIC imager, according to certain aspects of the disclosure.
Figure 3A:
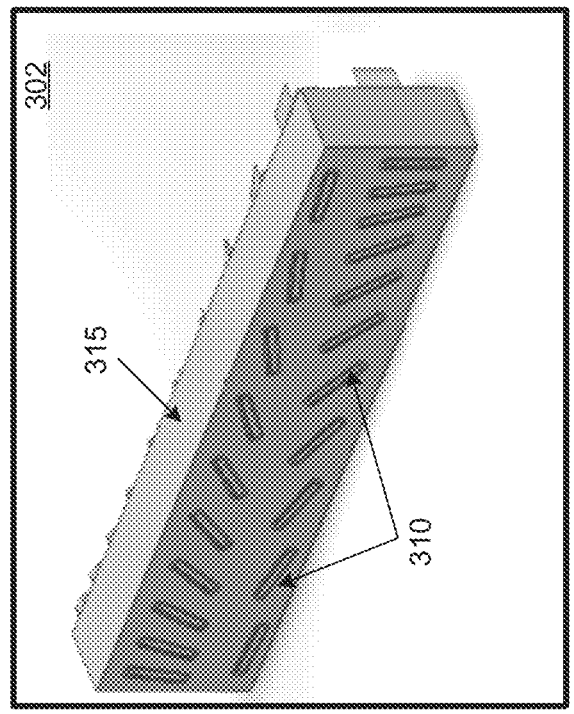

FIGS. 3A and 3B are schematic diagrams illustrating a front view 300A and a rear view 300B of an example linear-fan-configured PIC imager 302, according to certain aspects of the disclosure. The linear-fan-configured PIC imager 302 (hereinafter, PIC imager 302) is structurally and functionally similar to the PIC imager 100 of FIG. 1. The front view 300A shows that the PIC imager units 310, which are similar to the PIC imager units 110 of FIG. 1 and 210 of FIG. 2A, are scattered in an arbitrary configuration, for example in two rows, over a substrate 315. The interspacing and orientations of the PIC imager units 310 can be chosen randomly and in an optimized manner, as discussed above with respect to FIG. 1.

The rear view 300B depicts the end sides of the PIC imager units 310 being coupled to optical connectors (e.g., fiber ribbons) 360.

Figure 4:
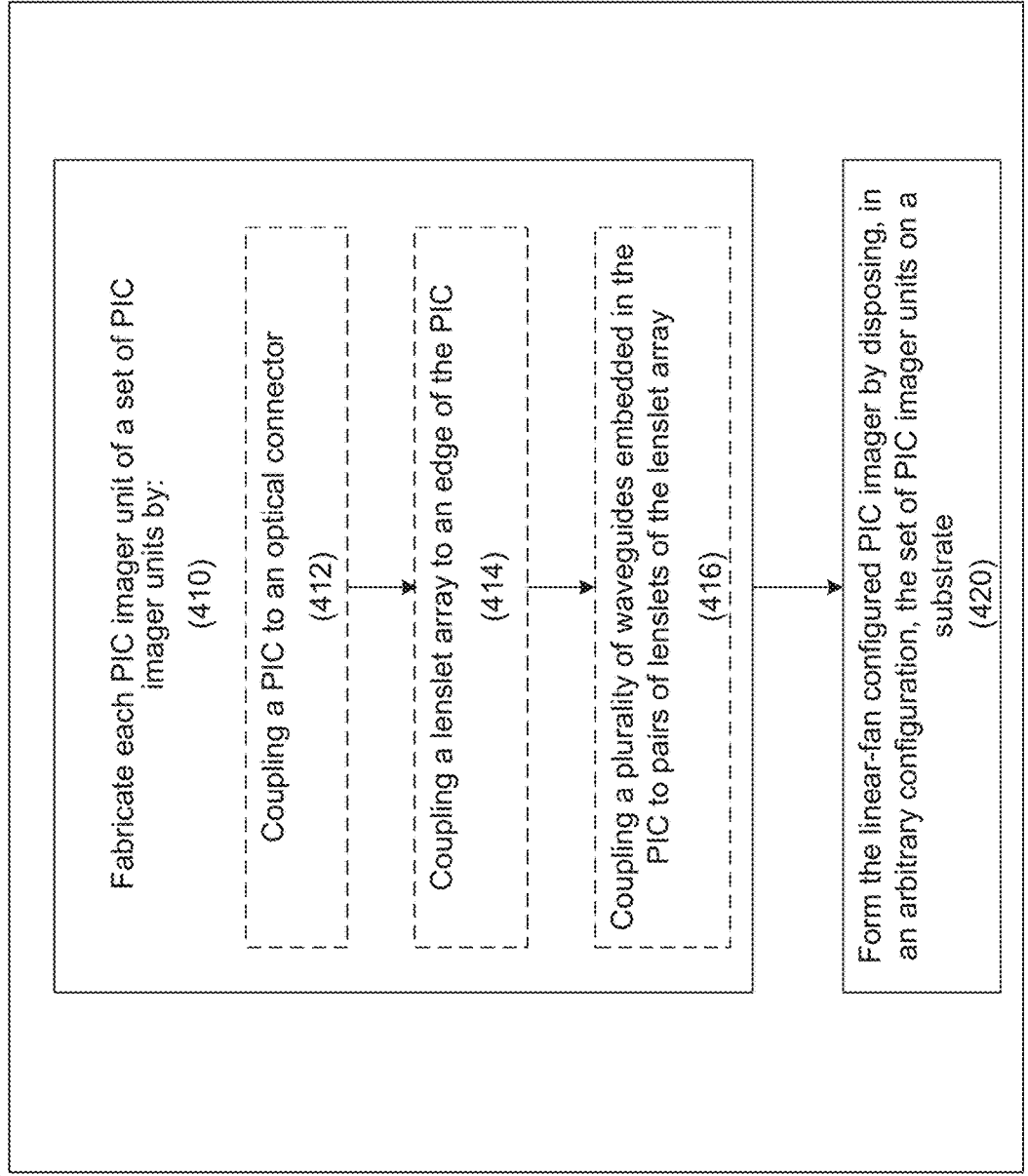
FIG. 4 is a flow diagram illustrating an example method of providing a linear-fan-configured PIC imager, according to certain aspects of the disclosure.

FIG. 4 is a flow diagram illustrating an example method 400 of providing a linear-fan-configured PIC imager (e.g., 100 of FIG. 1), according to certain aspects of the disclosure. The method 400 includes fabricating each PIC imager unit (e.g., 110 of FIG. 1) of a set of PIC imager units by (410): coupling a PIC (e.g., 220 of FIG. 2A) to an optical connector (e.g., 260 of FIG. 2A) (412); coupling a lenslet array (e.g., 240 of FIG. 2A) to an edge of the PIC (414); and coupling a number of waveguides (e.g., 222 of FIG. 2B) embedded in the PIC to pairs of lenslets (e.g., 242 of FIG. 2B) of the lenslet array (416). The method 400 further includes forming the linear-fan-configured PIC imager by disposing, in an arbitrary configuration, the set of PIC imager units on a substrate (e.g., 115 of FIG. 1 or 315 of FIG. 3) (420).

Figure 5:
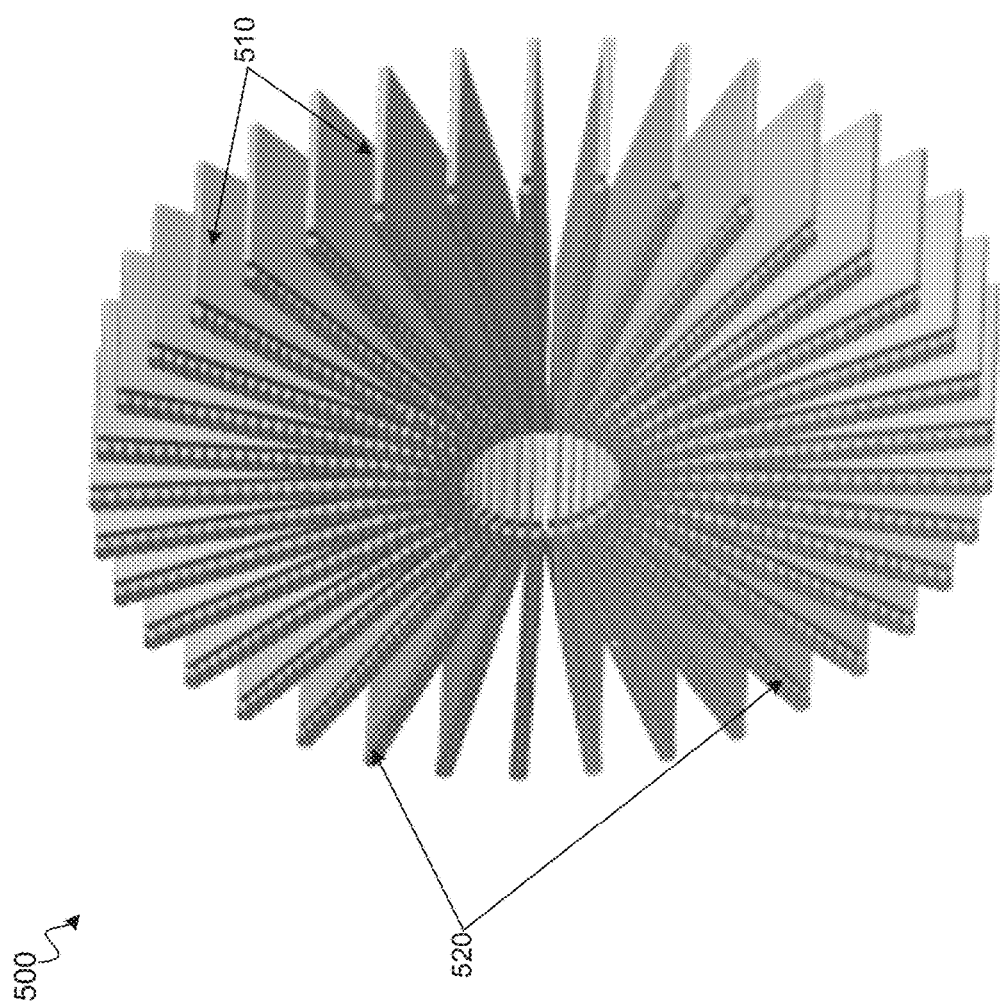
FIG. 5 is a conceptual diagram illustrating an example of a segmented planar imaging detector for electro-optical reconnaissance (SPIDER).

FIG. 5 is a conceptual diagram illustrating an example of a SPIDER 500. SPIDER 500 is a multi-blade structure formed of a large number of blades 510. Each blade 510 includes a sensor array implemented on a PIC. Each sensor array is an interferometric imaging device including a number of waveguide arrays. Each blade 510 includes a lenslet array 520 consisting of a large number of lenslets arranged in a linear array and coupled to an edge of blade 510. Each lenslet concentrates light rays to a number of waveguides of a waveguide array. More detailed discussion of the SPIDER can be found in the U.S. Pat. No. 8,913,859 B1, which is incorporated by reference herein.

In some aspects, the subject technology is related to photonic integrated circuits, and more particularly to a linear-fan configuration of PICs. In some aspects, the subject technology may be used in various markets, including, for example and without limitation, sensor technology and communication system markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A photonic integrated circuit (PIC) imager comprising:
   a substrate; and
   a plurality of PIC imager units disposed in an arbitrary configuration on the substrate, a PIC imager unit of the plurality of PIC imager units comprising:
   a PIC coupled to an optical connector; and
   a plurality of lenslets configured as a linear lenslet array and optically coupled to an edge of the PIC,
   wherein pairs of lenslets of the linear lenslet array are optically coupled to respective waveguides embedded in the PIC.

2. The PIC imager of claim 1, wherein optical axes of lenslets of the linear lenslet array are aligned with a plane of the PIC.

3. The PIC imager of claim 1, wherein the lenslets of the linear lenslet array are configured to input light beams from a target into the respective waveguides.

4. The PIC imager of claim 1, wherein the respective waveguides are configured to couple the pairs of lenslets of the linear lenslet array to the optical connector.

5. The PIC imager of claim 1, wherein the respective waveguides are configured to couple the pairs of lenslets of the linear lenslet array to achieve a baseline length distribution.

6. The PIC imager of claim 5, wherein the arbitrary configuration of the plurality of PIC imager units comprises arbitrary inter-units spacing and random orientations of the plurality of PIC imager units on the substrate.

7. The PIC imager of claim 6, wherein the arbitrary inter-units spacing and random orientations of the plurality of PIC imager units on the substrate are based on an optimization of an angular distribution and area coverage of the plurality of PIC imager units on the substrate.

8. An interferometric imager comprising:
   a compact package of a set of multi-lenslet PIC imager units configured to sample spatial frequencies of a target, each multi-lenslet PIC imager unit comprising:
   a PIC coupled to a lenslet module including a lenslet array; and
   a plurality of waveguides embedded in the PIC and configured to optically couple pairs of lenslets of the lenslet arrays to an optical connector,
   wherein PIC imager units of the set of multi-lenslet PIC imager units are disposed in a random configuration on the substrate.

9. The interferometric imager of claim 8, wherein optical axes of lenslets of the lenslet arrays are aligned with a plane of the PIC.

10. The interferometric imager of claim 8, wherein lenslets of the lenslet array are configured to direct input light beams from the target into respective waveguides of the plurality of waveguides.

11. The interferometric imager of claim 10, wherein the respective waveguides of the plurality of waveguides are configured to couple the pairs of lenslets of the lenslet array to achieve a baseline length diversity.

12. The interferometric imager of claim 8, wherein the set of multi-lenslet PIC imager units are arranged in a random configuration.

13. The interferometric imager of claim 12, wherein the random configuration comprises arbitrary inter-units spacing and random orientations of the PIC imager units of the set of multi-lenslet PIC imager units.

14. The interferometric imager of claim 8, wherein the compact package of the set of multi-lenslet PIC imager units is a rectangular package with dimensions ranging from about a few centimeters to less than about 30 centimeters.

15. The interferometric imager of claim 8, further comprising an interposer coupled to the PIC, wherein the interposer comprises an electronic integrated circuit (EIC) packaged with the PIC.

16. A method of providing a linear-fan-configured PIC imager, the method comprising:
fabricating each PIC imager unit of a set of PIC imager units by:
coupling a PIC to an optical connector;
coupling a lenslet array to an edge of the PIC; and
coupling a plurality of waveguides embedded in the PIC to pairs of lenslets of the lenslet array; and
forming the linear-fan-configured PIC imager by disposing the set of PIC imager units on a substrate in an arbitrary configuration.

17. The method of claim 16, wherein forming the linear-fan-configured PIC imager by disposing the set of PIC imager units comprises disposing the set of PIC imager units with inter-units spacing and random orientations.

18. The method of claim 17, wherein disposing the set of PIC imager units with inter-units spacing and random orientations is performed while optimizing an angular distribution and area coverage of the PIC imager units on the substrate.

19. The method of claim 16, further comprising configuring lenslets of the lenslet array to input light beams from a target into respective waveguides of the plurality of waveguides.

20. The method of claim 16, wherein coupling the lenslet array to the edge of the PIC comprises aligning optical axes of lenslets of the lenslet array with a plane of the PIC.

* * * * *